US007017954B2

(12) United States Patent
Eklund et al.

(10) Patent No.: US 7,017,954 B2
(45) Date of Patent: Mar. 28, 2006

(54) DOOR LATCH ASSEMBLY

(75) Inventors: Wesley K. Eklund, Muskegon, MI (US); Andrew Hartmann, Muskegon, MI (US)

(73) Assignee: Fleet Engineers, Inc., Muskegon, MI (US)

( * ) Notice: Subject to any disclaimer, the term of this patent is extended or adjusted under 35 U.S.C. 154(b) by 59 days.

(21) Appl. No.: 10/605,314

(22) Filed: Sep. 22, 2003

(65) Prior Publication Data

US 2004/0140676 A1 Jul. 22, 2004

Related U.S. Application Data

(60) Provisional application No. 60/319,891, filed on Jan. 21, 2003.

(51) Int. Cl.
*E05C 19/10* (2006.01)

(52) U.S. Cl. .......................... 292/97; 292/95; 292/100; 292/108; 292/134; 292/241; 292/242; 292/336.3; 292/DIG. 32; 70/211

(58) Field of Classification Search .................. 292/97, 292/95, 100, 104, 108, 134, 205, DIG. 36, 292/336.3; 70/209–217
See application file for complete search history.

(56) References Cited

U.S. PATENT DOCUMENTS 839,576 A * 12/1906 Garrett ........................ 105/24
1,519,717 A * 12/1924 Bilodeau .................... 292/100
1,691,028 A * 11/1928 Axelson ..................... 292/104
2,517,185 A * 8/1950 Elmer ........................ 292/130
3,347,580 A 10/1967 Whiting
3,476,425 A * 11/1969 Chartrand ................... 292/113
3,510,162 A * 5/1970 Binns et al. ................ 292/241
3,514,142 A * 5/1970 Smith ......................... 292/113
3,596,954 A * 8/1971 Hull et al. .................. 292/128
3,622,189 A * 11/1971 Rosehitz et al. ............ 292/240
3,642,314 A * 2/1972 Smith et al. ................ 292/134
3,740,978 A * 6/1973 Smith et al. .................. 70/100
3,802,726 A * 4/1974 Galbreath et al. .......... 292/100
3,883,164 A * 5/1975 Galbreath et al. ............ 292/92
3,893,722 A * 7/1975 Galbreath et al. .......... 292/100
3,958,822 A 5/1976 Germer
4,014,572 A 3/1977 Binns
4,390,196 A * 6/1983 Madland ...................... 292/66
4,581,907 A * 4/1986 Eberly ........................... 70/54
4,632,595 A * 12/1986 Schaeff ....................... 403/330
4,895,007 A * 1/1990 Eberly ........................... 70/54
4,941,703 A * 7/1990 Curry ........................ 296/37.6
5,098,139 A * 3/1992 Larsson ....................... 292/97
5,704,663 A * 1/1998 Clay, Jr. .................... 292/198
6,550,824 B1 * 4/2003 Ramsauer ................... 292/126

* cited by examiner

*Primary Examiner*—Brian E. Glessner
*Assistant Examiner*—Carlos Lugo
(74) *Attorney, Agent, or Firm*—McGarry Bair PC

(57) ABSTRACT

A latch assembly for a trailer roll up door has a base plate, a handle and hook assembly with a locking flange rotatably mounted to the base plate, a closed keeper to selectively retain the handle in the closed position. The closed keeper is moveably mounted to the base plate for movement between a latched position and an unlatched position. The movement of the closed keeper is limited by stops on the base plate and further has a rotation stop that is adapted to contact a portion of the handle when the closed keeper is in the unlatched position and the handle is moved to the closed position to move the closed keeper into the latched position.

13 Claims, 7 Drawing Sheets

DOOR LATCH ASSEMBLY

CROSS REFERENCE TO RELATED APPLICATIONS

This application claims the benefit of U.S. Provisional Patent Application Ser. No. 60/319,891, filed Jan. 21, 2003.

BACKGROUND OF INVENTION

1. Field of the Invention

This invention relates to door latches. In one of its aspects, the invention relates to a door latch for a roll up door. In another of its aspects, the invention relates to a roll up door with a latch. In another of its aspects, the invention relates to a door latch assembly with a closed keeper that is moved into a locking position by the movement of a handle into a closed position. In another of it aspects, the invention relates to a door latch assembly with a closed keeper that is rotatably mounted to a plate for movement between fixed stops.

2. Description of the Related Art

U.S. Pat. No. 4,014,572 to Binns discloses a door latch assembly comprising a latch bolt, a closed keeper, and a bolt catch, all pivotally mounted to a support plate. The closed keeper is weighted so that a finger normally swings against a lug to maintain the keeper in the position illustrated in a closed position absence any force on it. The degree of rotation is limited by a pin on the keeper that fits within a slot on the support plate. The bolt catch is also weighted so that it is maintained in a ready position as well. The bolt catch further has a projection that catches a projection on the latch bolt to keep the bolt latch in the open position. The support plate is mounted to the door to thereby mount the entire latch assembly to the door. If the closed keeper is stuck in the unlatched position when the latch bolt is moved to the closed position, the closed keeper may not maintain the latch bolt in the closed position. Further there is no mechanism to lock the latch bolt in the closed position.

A currently available door latch assembly comprises a handle and hook pivotally mounted to a support plate, a closed keeper and an opened keeper. The closed keeper is pivotally mounted to the door and is weighted to retain the handle in a closed position. The handle also has at one end a transverse locking flange with an opening that registers with an opening in the closed keeper so that a padlock can secure the latch in the locked position. The closed keeper rotates about an axis above the axis of rotation of the handle and thus relies on gravity to position the closed keeper in the closed position. There is not positive or automatic movement of the closed keeper from the open to the closed position in the event that the closed keeper is stuck in the open position.

SUMMARY OF INVENTION

According to the invention, a latch assembly is provided for a trailer comprising a door opening partially defined by a bottom wall of the trailer, and which opening is selectively closed by a door moveably mounted to the trailer. The latch assembly comprises a base plate adapted to mount to the door, a handle having a locking flange rotatably mounted to the base plate for rotation between a closed position and an open position, a hook rotatably mounted to the base plate and operably coupled to the handle for rotation between a locked and an unlocked position as the handle is rotated between the closed and open positions and a closed keeper having a handle catch portion and moveably mounted to the base plate for movement between a latched position and an unlatched position. When the keeper is in the latched position, the handle locking flange is received by the keeper handle catch portion when the handle is in the closed position to maintain the handle in the closed position. When the keeper is in the unlatched position, the handle locking flange is released by the closed keeper handle catch portion, whereby the handle can rotate from the closed position to the open position without interference from the closed keeper.

In one embodiment, the closed keeper further has a rotation stop that is adapted to contact a portion of the handle when the closed keeper is in the unlatched position and the handle is moved from the open position to the closed position to move the closed keeper into the latched position in the event that the closed keeper is in the open position as the handle moved from the open position to the closed position.

In another embodiment of the invention, stops are formed between the closed keeper and the base plate, and the stops limit the rotation of the closed keeper between the open and latched positions. Preferably, the base plate comprises a tab extending laterally therefrom and the closed keeper further comprises a first stop for limiting the movement of the closed keeper to the unlatched position and a second stop for limiting the movement of the closed keeper to the latched position.

In a preferred embodiment, the closed keeper is rotatably mounted to the base plate. Further, the closed keeper is biased to the latched position. The closed keeper has an axis of rotation with respect to the base plate that creates a gravitational bias to move the closed keeper to the latched position.

In another embodiment of the invention, the base plate comprises a tab extending laterally therefrom and the closed keeper further comprises a first stop for limiting the movement of the closed keeper to the unlatched position and a second stop for limiting the movement of the closed keeper to the latched position.

In one embodiment, the handle further has a retainer flange and an open keeper is mounted to the base plate for movement between a retention position and a release position. When the open keeper is in the open position, the handle retainer flange is received by an open keeper handle catch portion to retain the handle in the open position. When the open keeper is in the release position, the open keeper handle catch portion releases the handle retainer flange, whereby the handle can rotate from the open position to the closed position. Preferably, the open keeper is biased to the retention position. Preferably, the open keeper is spring biased to the retention position.

DETAILED DESCRIPTION

Figure 1:
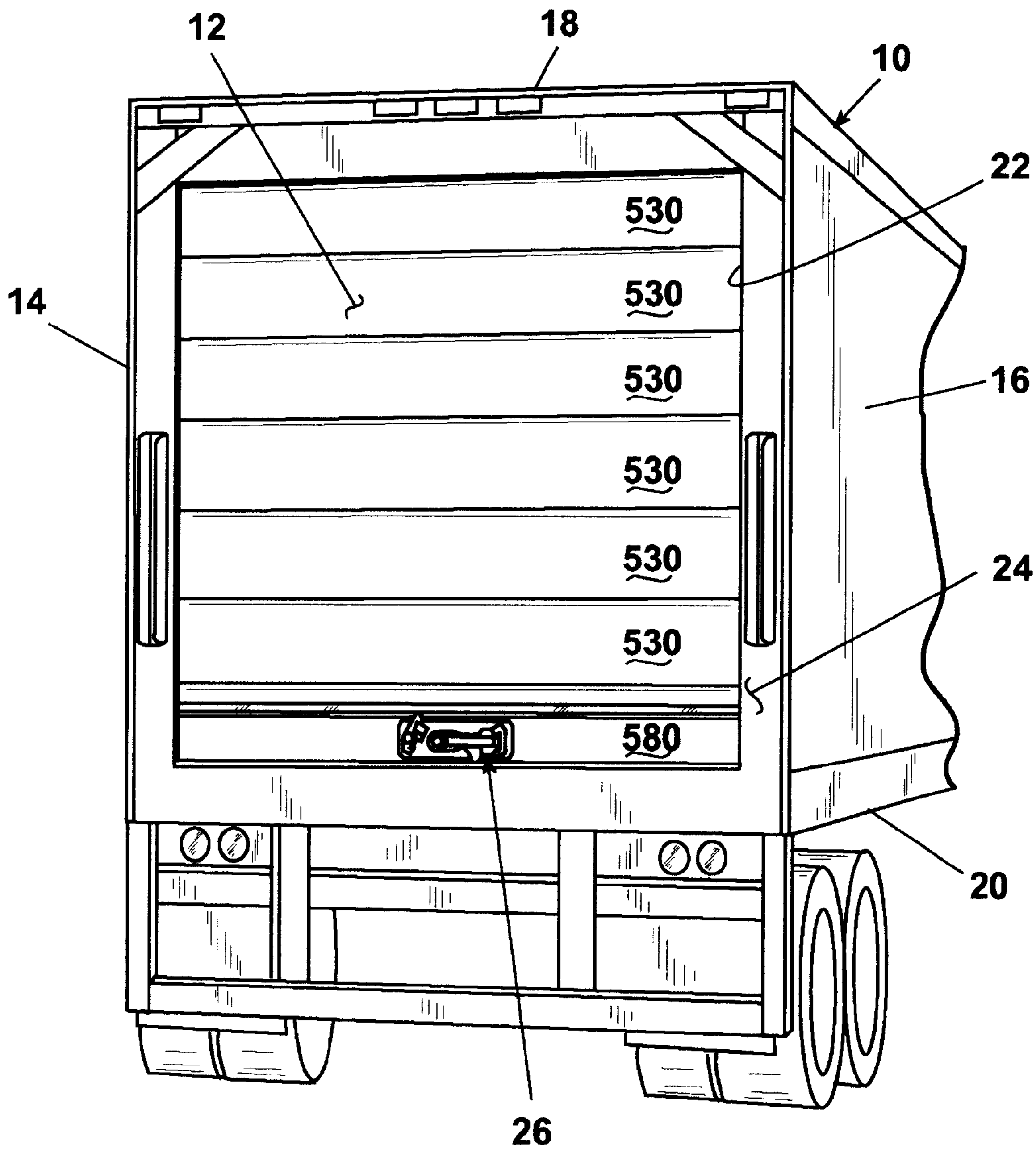
FIG. 1 is a rear perspective view of a trailer incorporating a roll-up door with the latch according to the invention.

Referring to FIG. 1, a truck or semi-trailer 10 incorporates a roll-up door 12 according to the invention. The trailer 10 is of a well-known design and comprises opposing sidewalls 14, 16, which are connected at their upper ends by a top wall 18 and at their lower ends by a bottom wall 20. The top wall 18, bottom wall 20, and sidewalls 14, 16 collectively define a rear opening 22 that is bounded by a peripheral frame 24. The roll-up door 12 is mounted to the trailer 10 such that the roll-up door 12 closes the rear opening 22 when the roll-up door is in the lowered position as illustrated in FIG. 1. A latch assembly 26 is mounted to a bottom panel 580 for locking the roll-up door 12 in the closed position.

Figure 2:
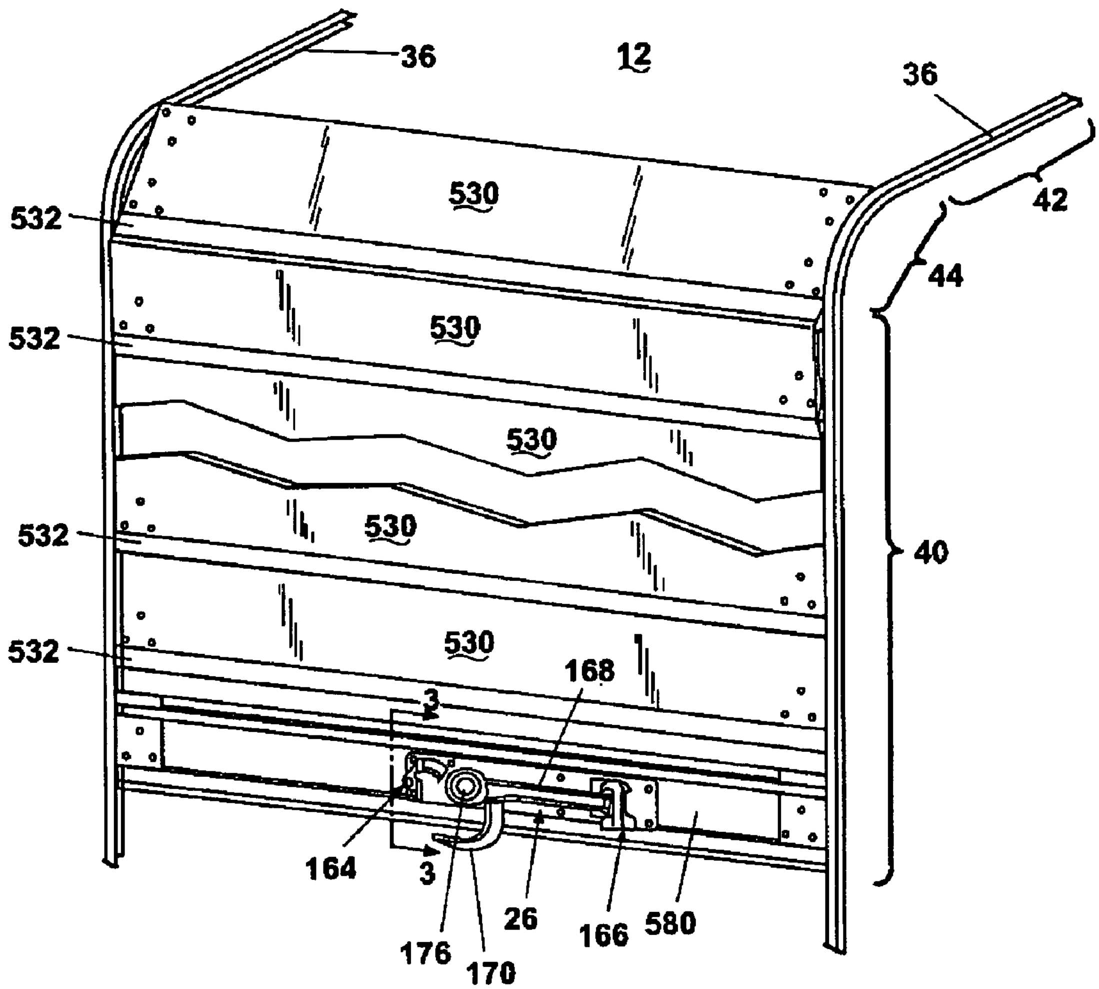
FIG. 2 is a perspective view of the roll-up door illustrated in FIG. 1 and showing the latch in more detail.

Referring to FIG. 2, the roll-up door 12 is shown with the trailer 10, with the top wall 18, bottom wall 20, and sidewalls 14, 16 removed for clarity. The roll-up door 12 comprises multiple panels 530 that are hingedly connected by hinge assemblies 532. Roller assemblies (not shown) are carried by each side of the panels 530 and movably couple the panels 530 to a pair of tracks 36.

The tracks 36 are of a traditional design and have a stretched C-shaped cross-section that defines a channel in which the roller assemblies are received. The tracks 36 are typically mounted to the sidewalls 14, 16, respectively. Each of the tracks 36 can be conceptually divided into a vertical portion 40 and a horizontal portion 42, which are connected by a curved or turn portion 44. The vertical portion 40 is normally located adjacent to the peripheral frame 24 of the trailer 10 and the horizontal portion 42 is normally located adjacent the top wall 18 of the trailer. In this manner, the multiple, hingedly-connected panels 530 can be moved from the closed or lowered position as seen in FIG. 1, where almost all of the panels are located in the vertical portion 40 of the tracks 36. to an opened or raised position, where almost all of the panels are received in the horizontal portion 42 of the tracks 36. The curved portion 44 aids in transitioning the multiple, hingedly-connected panels 530 from the vertical portion to the horizontal portion. The latch assembly 26 comprises a handle 168 and a hook 170, which are pivotally mounted to a support plate 162 through a pin 176, an open keeper 164 and a closed keeper 166.

Figure 3:
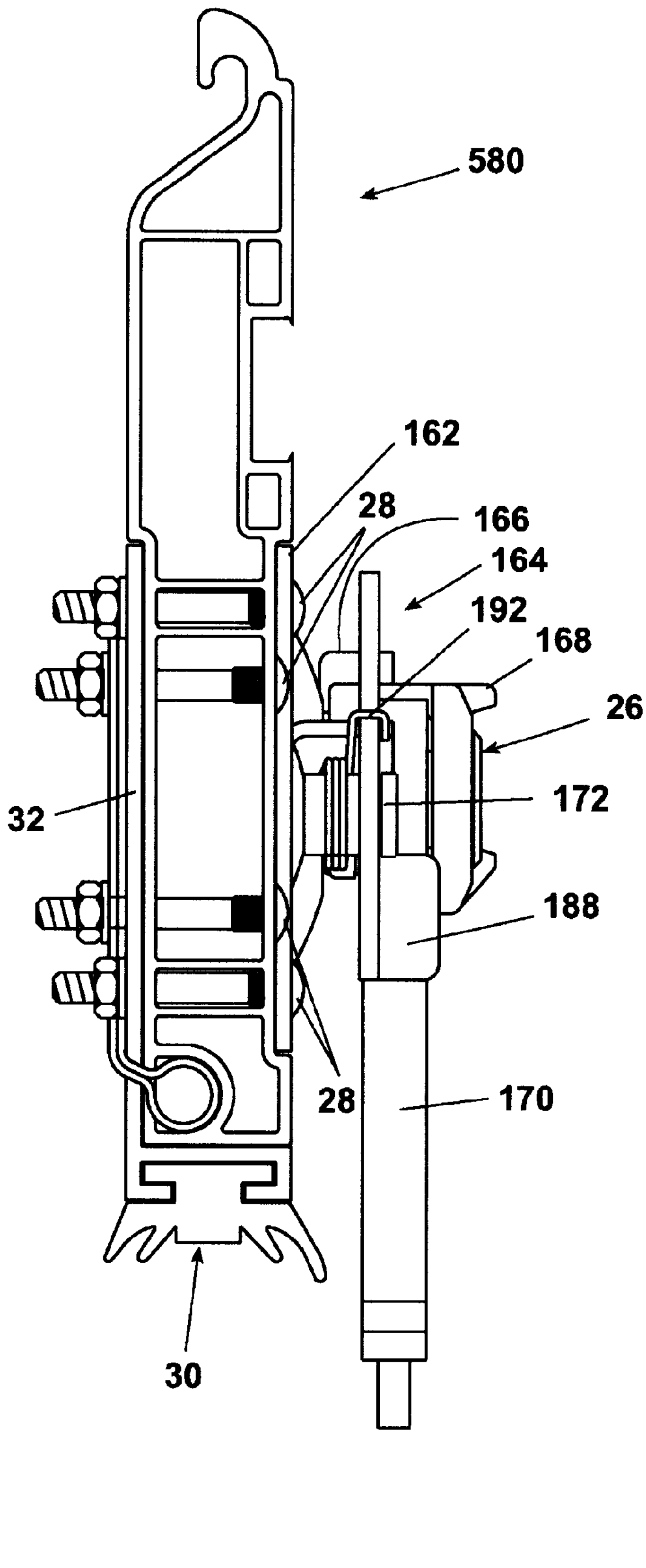
FIG. 3 is a side view of the latch and for taking along lines 3—3 of FIG. 2.

Referring to FIGS. 3–11, the latch assembly comprises a base plate 162 to which is pivotally mounted: an opened keeper 164, a closed keeper 166, a handle 168, and a latch or hook 170. The base plate 162 further comprises three mounting pins 172, 174, and 176 for mounting the opened keeper 164, closed keeper 166, and the handle 168 and hook 170, respectively. The base plate 162 additionally includes two flanges 178, 180 formed from and bent laterally from the base plate 162. The flange 178 is located near the opened keeper pin 172 and the flange 180 is located near the closed keeper pin 174. The base plate 162 is mounted to the bottom panel through bolts 28 and a back plate 32. As illustrated in FIG. 3, the bottom panel 580 has a seal assembly 30 at a bottom edge thereof.

Figure 11:
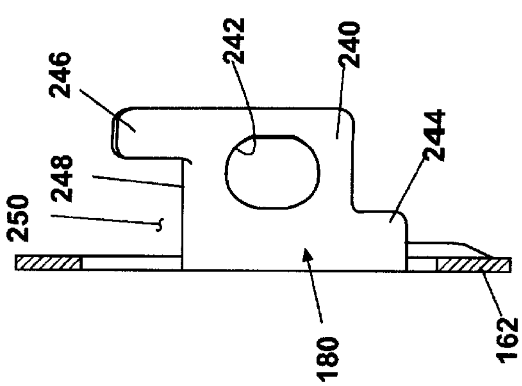
FIG. 11 is a partial section view taken along lines 11—11 of FIG. 8.
Figure 9:
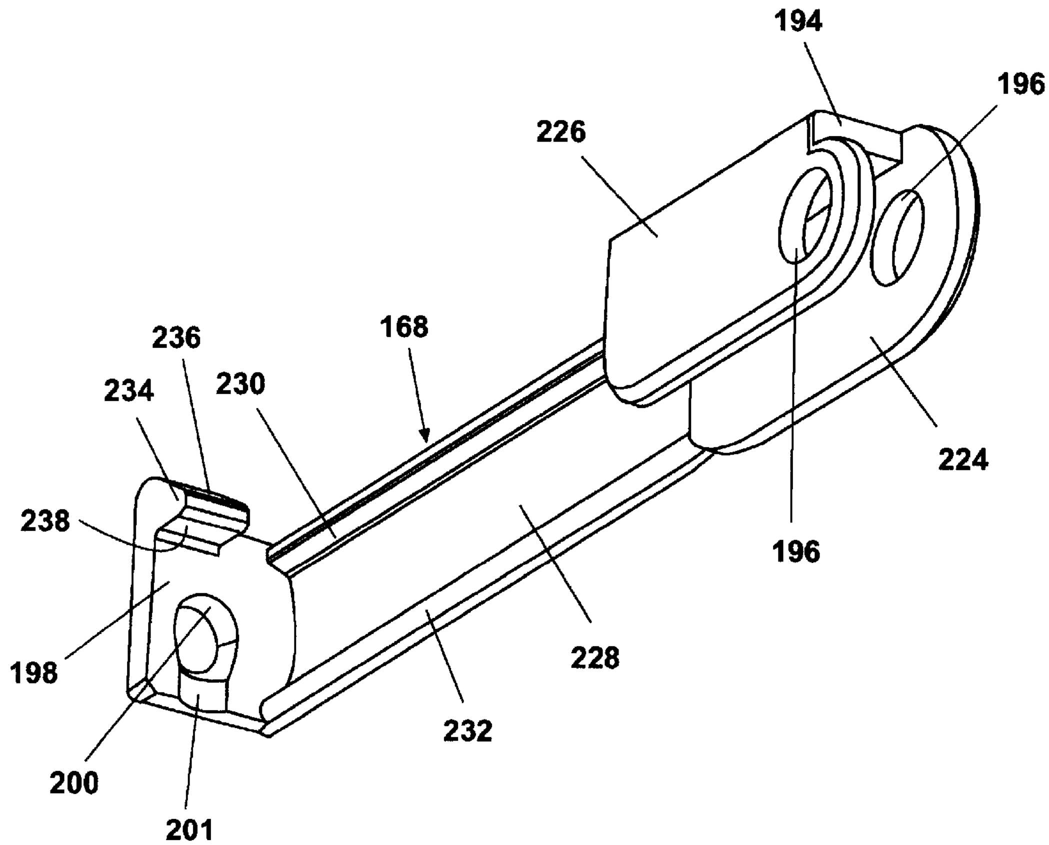
FIG. 9 is a bottom perspective view of the handle that forms a part of the latch assembly illustrated in FIGS. 1–8.
Figure 10:
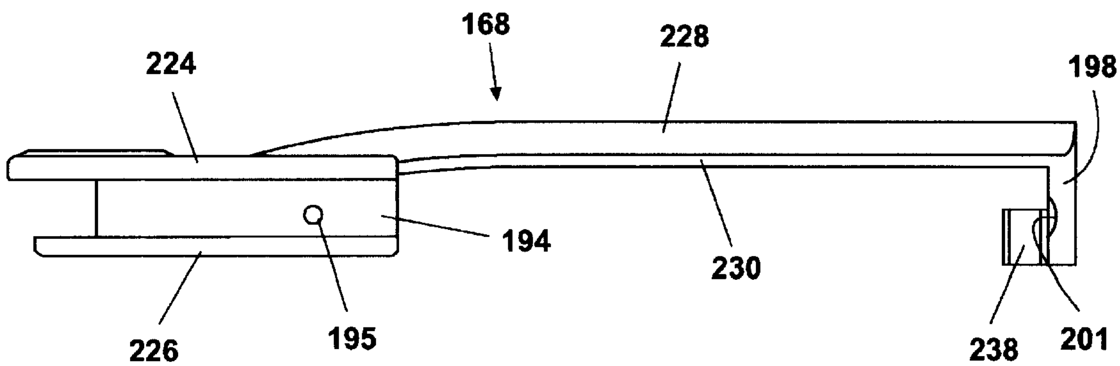
FIG. 10 is a bottom view of the handle shown in FIG. 9.

As illustrated in FIG. 11, the flange 180 comprises central portion 240 having a central opening 242 and an upper edge 248, a lower leg 244 and an upper finger 246. The upper edge 248 and the upper finger 246 for a slot 250.

Figures 4, 5, 6, 7:
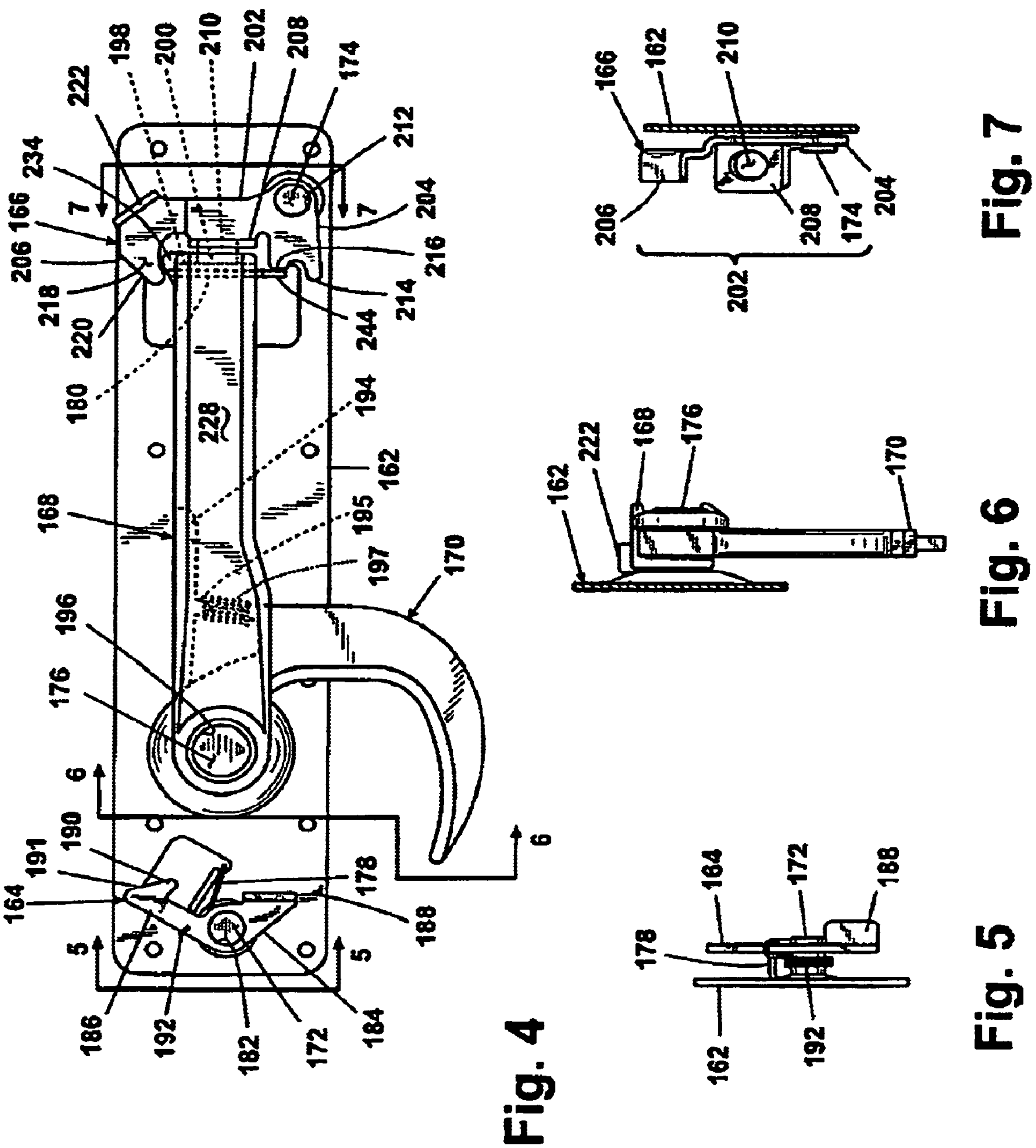
FIG. 4 is a front view of the latch assembly of FIGS. 1–3 shown in the closed or latched position and illustrating an opened and a closed keeper on opposite sides of a rotatably mounted handle that is coupled to a hook.
FIG. 5 is a view taken along line 5—5 of FIG. 4.
FIG. 6 is a sectional view taken along line 6—6 of FIG. 4 and illustrating the handle and hook pivotally mounted to the base plate.
FIG. 7 is a sectional view taken along line 7—7 of FIG. 4 and illustrating the closed keeper pivotally mounted to the base plate.

Referring to FIGS. 4 and 5, the opened keeper 164 comprises a central opening 182 through which the opened keeper pin 170 is inserted. Lower leg 184 and upper leg 186 extend away from the central opening 182. The lower leg 184 terminates in an outwardly extending finger 188. The upper leg 186 terminates in a catch 190. A torsion spring 192 spans between the flange 178 and the upper leg 186 to bias the upper leg toward the mounting pin 176 for the handle 168 and hook 170.

Referring to FIGS. 4, 6, 9 and 10, the handle 168 comprises a pair of depending mounting flanges 224 and 226, each of which has an aligned opening 196 through which the mounting pin 176 is slidably received. A connecting flange 194 that has a nipple 195 on an underside thereof joins the mounting flanges 224 and 226. A side plated 228 extends laterally from the mounting flange 224 and has an upper reinforcing flange 230 and a lower reinforcing flange 232. The side plate 228 joins a laterally extending locking flange 198 that has an opening 200 and a groove 201 therein. The locking flange 198 extends laterally toward the mounting plate 162. A retainer projection 234 extends laterally from the locking flange 198 toward the mounting flange 226 and has an upper cain surface 236 and a lower cam surface 238. The nipple 195 receives and mounts one end of a coil spring 197.

Referring to FIGS. 4 and 6, the hook 170 is of a well-known design and includes an opening (not shown) through which the pin 176 is received. The hook 170 further includes a nipple (not shown) for receiving and mounting the other end of the coil spring 197. The hook 170 is designed to couple with a pin located on the truck in a traditional manner to lock the roll-up door in the closed position.

Referring to FIGS. 4 and 7, the closed keeper 166 comprises a main body 202 from which extends a lower leg 204 and an upper leg 206, which is laterally offset relative to the main body 202. The main body 202 includes a laterally outwardly directed locking flange 208 in which is ed an opening 210. In the closed position as illustrated in FIG. 4, the opening 242 in the bent flange 180, the opening 200 in the locking flange 198 and the opening 210 in the closed keeper 166 are aligned and can receive a padlock or similar device for locking the handle 168 to the keeper 166.

The lower leg 204 comprises an opening 212 that slidably receives the mounting pin 174 to rotatably mount the closed keeper 166 to the base plate 162. A first rotation stop 214 extends away from the lower leg 204 and is of a length that the rotation stop 214 will contact the leg 244 upon the continued rotation (clockwise as viewed in FIG. 8) of the closed keeper 166 about the mounting pin 174. Similarly, a second rotation stop 216, which is positioned above the first rotation stop 214, is of a length that the rotation stop 216 will contact the leg 244 upon the continued rotation (counter-clockwise as viewed in FIG. 8) of the closed keeper 166 about the mounting pin 174.

The first and second rotation stops 214, 216 function collectively to limit the rotational range of the closed keeper 166. This feature is important since the center of gravity of the closed keeper 166 lies to the left of a vertical axis passing through the mounting pin 174 (as viewed in FIGS. 4 and 8) and the closed keeper 166 inherently tends to rotate counterclockwise.

The upper leg 206 terminates in a catch 218 having an angled upper surface 220. A finger tab 222 is provided on the opposite end of the upper leg 206 and the catch 218. The finger tab 222 provides a structure that a user can grasp to rotate the closed keeper 166 clockwise and release the handle 168.

Figure 8:
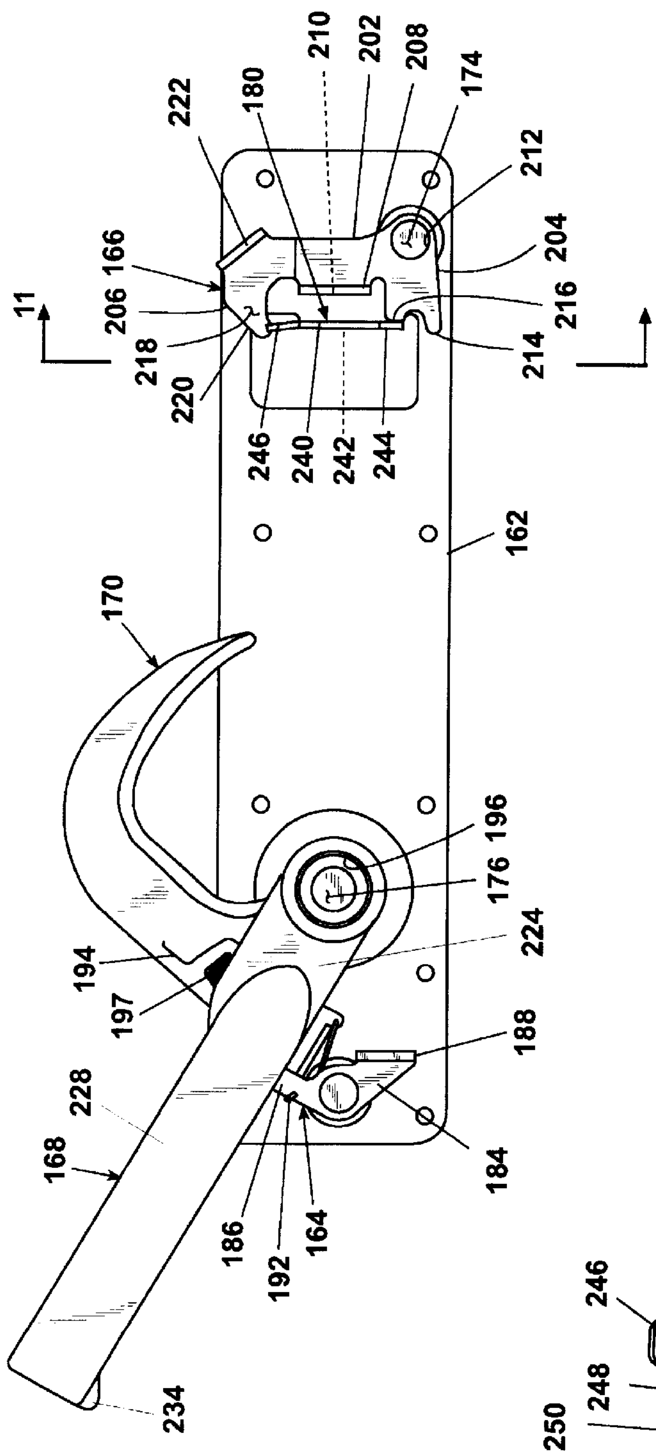
FIG. 8 is a view similar to FIG. 4 of the latch assembly in the open position.

With reference to FIGS. 4 and 8, the operation of the latch assembly will be briefly described. For this description, it is assumed that the latch assembly is in the closed position as illustrated in FIG. 4. In the closed position, the handle 168 is substantially horizontal with the lower cam surface 238 resting on the upper edge 248 of the flange 180 such that the opening 200 in the locking flange 198 of the handle 168 is aligned with the opening 210 of the locking tab 208 of the closed keeper 166 and the opening 242 of the flange 180. In this position, the rotation stop 216 abuts the lower leg 244 of the flange 180.

To move the handle 168 from the lock position, the closed keeper 166 is rotated clockwise until the catch 218 no longer overlies the retaining projection 234 of the handle 168. The clockwise rotation is stopped by the interference between the first rotational stop 214 and the lower leg 244 of the flange 180. The closed keeper 166 is preferably rotated by a user pressing against the finger tab 222 to manually rotate the closed keeper 166.

Once the closed keeper 166 is rotated out of the path of the handle 168, the handle is rotated counterclockwise from the closed position as illustrated in FIG. 4 to the opened position as illustrated in FIG. 8, which is generally 150 degrees opposite the closed position. As the handle 168 is rotated to the opened position, the retainer flange 194 of the handle 168 (hidden surface) contacts the slanted surface 191 of the catch 190 for the opened keeper 164. Upon the continued rotation of the handle 168, the retainer flange 194 of the handle 168 continues to bear against the slanted surface 191 and drives a counterclockwise rotation of the opened keeper 164 about the mounting pin 172 against the resistance of the torsion spring 192. As the handle 168 continues in its clockwise rotation, connecting flange 194 of the handle 168 clears the catch 190 and the torsion spring 192 initiates the clockwise rotation of the opened keeper 164 so that the catch 190 overlies the connecting flange 194 of the handle 168 and locks it in the opened position. To release the handle 168 from the opened position, the opened keeper 164 is rotated counterclockwise until the catch 190 clears the handle body 168. Applying pressure to the tab 188 in a counterclockwise direction rotates the opened keeper 164 counterclockwise.

As the handle 168 is moved from the closed position to the opened position, the hook 170 is similarly moved from the closed position as shown in FIG. 4 to an opened position as shown in FIG. 8. In the closed position, the hook underlies a pin formed in the trailer 10 which prevents the vertical movement of the latch assembly and, thus, the roll-up door. In the opened position, the hook 170 is rotated counterclockwise until it clears the pin. Preferably the hook 170 is coupled to the handle 168 by the spring connected to the corresponding nipples in a well-known manner.

Figure 12:
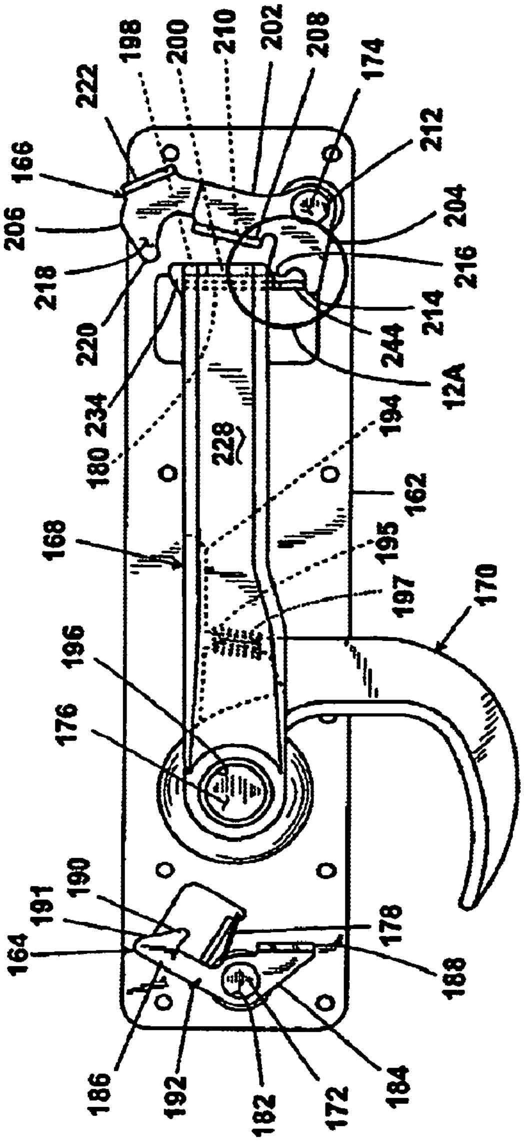
FIG. 12 is a view similar to FIG. 4, showing the handle 168 approaching the closed position and showing the keeper in the unlatched position.
Figure 12A:
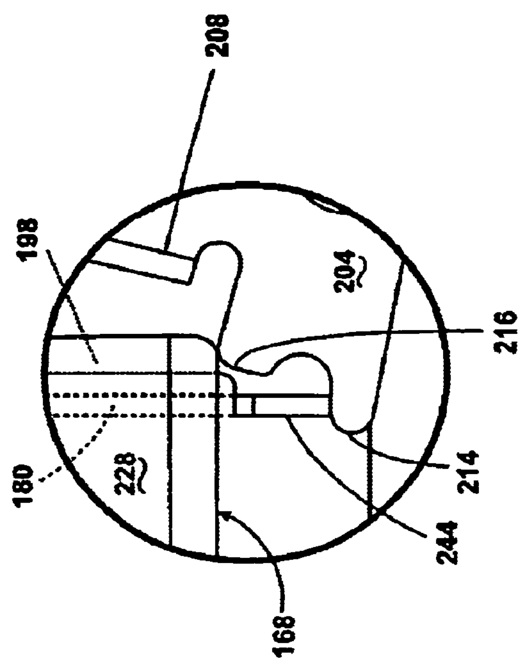
FIG. 12A is an enlarged partial view of the circled area 12A in FIG. 12.

As the handle is returned to the closed position, the handle locking flange 198 will normally contact the surface 220 of the catch 218. The continued rotation of the handle rotates the closed keeper 166 clockwise until the locking flange 198 clears the catch. As the locking flange 198 passes by the catch 218, the inherent over-center position of the closed keeper will normally rotate the closed keeper counterclockwise until the second stop 216 contacts the lower leg 244 of the flange 180, resulting in the catch overlying the retaining projection 234 and locking the handle 168 in the closed position and the hook in the locked position. In the event that the closed keeper 166 is stuck in the unlatched position, the end-bottom edge of the locking flange 198 of the handle 168 will strike a surface of the second stop 216 as illustrated in FIGS. 12 and 12A and move the closed keeper 166 to the latched position shown in FIG. 4.

Reasonable variation and modification are possible within the forgoing description of the drawings without departing from the spirit of the invention which is described in the appended claims.

The invention claimed is:

1. A latch assembly for a trailer comprising a door opening partially defined by a bottom wall of the trailer, and which opening is selectively closed by a door moveably mounted to the trailer, the latch assembly comprising:

a base plate adapted to mount to the door;

a handle rotatably mounted to the base plate for rotation between a closed position and an open position, the handle having a locking flange;

a hook rotatably mounted to the base plate and operably coupled to the handle for rotation between a locked and an unlocked position as the handle is rotated between the closed and open positions; and a closed keeper having a handle catch portion and moveably mounted to the base plate for movement between a latched position, wherein the handle locking flange is received by the keeper handle catch portion when the handle is in the closed position to maintain the handle in the closed position, and an unlatched position, wherein the handle locking flange is released by the closed keeper handle catch portion, whereby the handle can rotate from the closed position to the open position without interference from the closed keeper;

the closed keeper further having a surface that is adapted to contact a portion of the handle when the closed keeper is in the unlatched position and the handle is moved from the open position to the closed position to move the closed keeper into the latched position in the event that the closed keeper is in the open position as the handle moves from the open position to the closed position.

2. The latch assembly according to claim 1 wherein the closed keeper is rotatably mounted to the base plate.

3. The latch assembly according to claim 2 wherein the closed keeper is biased to the latched position.

4. The latch assembly according to claim 3 wherein the closed keeper has an axis of rotation with respect to the base plate that creates a gravitational bias to move the closed keeper to the latched position.

5. The latch assembly according to claim 4 wherein stops are formed between the closed keeper and the base plate, and the stops limit the rotation of the closed keeper between the open and latched positions.

6. The latch assembly according to claim 1 wherein stops are formed between the closed keeper and the base plate, and the stops limit the movement of the closed keeper between the open and latched positions.

7. The latch assembly according to claim 1 whether the handle further has a retainer flange, and further comprising an open keeper that has a handle catch portion and the open keeper is mounted to the base plate for movement between a retention position, wherein the handle retainer flange is received by the open keeper handle catch portion to retain the handle in the open position, and a release position, wherein the open keeper handle catch portion releases the handle retainer flange, whereby the handle can rotate from the open position to the closed position.

8. The latch assembly according to claim 7, wherein the open keeper is biased to the retention position.

9. The latch assembly according to claim 7, wherein the open keeper is spring biased to the retention position.

10. The latch assembly according to claim 1, wherein the base plate comprises a tab extending laterally therefrom and the closed keeper further comprises a first stop for limiting the movement of the closed keeper to the unlatched position and a second stop for limiting the movement of the closed keeper to the latched position.

11. The latch assembly according to claim 10 wherein the closed keeper is mounted to the base plate so that there is a gravitational bias of the closed keeper to move from the unlatched to the latched positions and the first and second stops limit the range of the closed keeper to a gravitational bias to the latched position.

12. A latch assembly for a trailer comprising a door opening partially defined by a bottom wall of the trailer, and which opening is selectively closed by a door moveably mounted to the trailer, the latch assembly comprising:

a base plate adapted to mount to the door;

a handle rotatably mounted to the base plate for rotation between a closed position and an open position, the handle having a locking flange;

a hook rotatably mounted to the base plate and operably coupled to the handle for rotation between a locked and an unlocked position as the handle is rotated between the closed and open positions; and a closed keeper having a handle catch portion and moveably mounted to the base plate for movement between a latched position, wherein the handle locking flange is received by the keeper handle catch portion when the handle is in the closed position to maintain the handle in the closed position, and an unlatched position, wherein the handle locking flange is released by the closed keeper handle catch portion, whereby the handle can rotate from the closed position to the open position without interference from the closed keeper;

wherein the base plate comprises a tab extending laterally therefrom and the closed keeper further comprises a first stop for limiting the movement of the closed keeper to the unlatched position and a second stop for limiting the movement of the closed keeper to the latched position.

13. The latch assembly according to claim 12 wherein the closed keeper is mounted to the base plate so that there is a gravitational bias of the closed keeper to move from the unlatched to the latched positions and the first and second stops limit the range of the closed keeper to a gravitational bias to the latched position.

* * * * *